(12) United States Patent
Stranner

(10) Patent No.: US 9,945,641 B2
(45) Date of Patent: Apr. 17, 2018

(54) BULLET-PROOF GLASS PANE WITH EDGE REINFORCEMENT

(76) Inventor: Siegfried Stranner, Munich (DE)

( * ) Notice: Subject to any disclaimer, the term of this patent is extended or adjusted under 35 U.S.C. 154(b) by 0 days.

(21) Appl. No.: 13/824,280

(22) PCT Filed: Sep. 21, 2011

(86) PCT No.: PCT/EP2011/004803
§ 371 (c)(1),
(2), (4) Date: Mar. 15, 2013

(87) PCT Pub. No.: WO2012/038095
PCT Pub. Date: Mar. 29, 2012

(65) Prior Publication Data
US 2013/0171398 A1  Jul. 4, 2013

(30) Foreign Application Priority Data
Sep. 22, 2010 (EP) ..................... 10010233

(51) Int. Cl.
*F41H 5/013* (2006.01)
*B32B 17/10* (2006.01)
*E06B 5/10* (2006.01)
*F41H 5/26* (2006.01)
*F41H 5/04* (2006.01)

(52) U.S. Cl.
CPC ....... *F41H 5/013* (2013.01); *B32B 17/10045* (2013.01); *B32B 17/10293* (2013.01); *B32B 17/10302* (2013.01); *E06B 5/106* (2013.01); *F41H 5/0407* (2013.01); *F41H 5/263* (2013.01); *Y10T 428/24777* (2015.01)

(58) Field of Classification Search
CPC . E06B 5/10; E06B 5/103; E06B 5/106; E06B 5/11; E06B 5/113; E06B 5/116; F41H 5/0407; F41H 5/263
USPC ........ 428/38, 60; 52/204.71, 800.11–800.17; 89/905
See application file for complete search history.

(56) References Cited

U.S. PATENT DOCUMENTS 4,272,941 A * 6/1981 Hasselbacher et al. ........ 52/844
4,394,806 A * 7/1983 Day ...................... E06B 3/677
52/172
(Continued)

FOREIGN PATENT DOCUMENTS

CN    101364468 A  *  2/2009
CN    101368468 A  *  2/2009
(Continued)

OTHER PUBLICATIONS

Machine translation of CN 101368468 A, obtained from Google Patent service on Oct. 4, 2015.*
(Continued)

*Primary Examiner* — Marla D McConnell
*Assistant Examiner* — Zheren Yang
(74) *Attorney, Agent, or Firm* — Hauptman Ham, LLP

(57) ABSTRACT

The invention relates to a bulletproof glass pane for use in a motor vehicle having a plurality of panes and layers of glass, ceramics or plastics connected two-dimensionally to each other in layers to form a composite, and having an edge reinforcement that extends at the periphery of the bulletproof glass pane, wherein the edge reinforcement comprises at least two or more reinforcing elements that are in loose mutual engagement.

12 Claims, 8 Drawing Sheets

(56) References Cited

U.S. PATENT DOCUMENTS

| | | | | |
|---|---|---|---|---|
| 4,962,710 | A * | 10/1990 | Habicht et al. | 109/79 |
| 5,207,046 | A * | 5/1993 | Vekkeli | B27M 3/0053 100/144 |
| 5,392,920 | A * | 2/1995 | Prete | B65D 85/307 206/320 |
| 6,129,974 | A * | 10/2000 | Woll | B32B 17/10045 428/192 |
| 6,280,826 | B1 * | 8/2001 | Woll | B32B 17/10045 109/49.5 |
| 6,327,954 | B1 * | 12/2001 | Medlin | F41H 5/0407 296/96.21 |
| 6,569,787 | B1 * | 5/2003 | Snelling | B32B 17/10293 2/2.5 |
| 6,581,342 | B1 * | 6/2003 | Tavivian | 52/204.595 |
| 6,708,595 | B1 * | 3/2004 | Chaussade | B32B 17/10064 428/911 |
| 7,254,927 | B1 * | 8/2007 | Farrar | B60J 1/2094 52/741.1 |
| 2001/0032422 | A1 * | 10/2001 | Farrar | B60J 1/2094 52/204.5 |
| 2001/0032540 | A1 * | 10/2001 | Gourio | B32B 17/10064 89/36.02 |
| 2003/0070371 | A1 * | 4/2003 | Kobrehel | B60J 1/2094 52/204.5 |
| 2003/0159370 | A1 * | 8/2003 | Drew | E01D 4/00 52/89 |
| 2005/0132873 | A1 * | 6/2005 | Diaz Supisiche | E05G 1/024 89/36.01 |
| 2007/0220822 | A1 * | 9/2007 | Permesang | E04F 13/08 52/392 |
| 2007/0251183 | A1 * | 11/2007 | Thiagarajan | E04C 2/543 52/590.1 |
| 2008/0187721 | A1 * | 8/2008 | Engl | B32B 17/10045 428/172 |
| 2009/0211190 | A1 * | 8/2009 | Honey | E06B 3/5878 52/309.3 |
| 2009/0241317 | A1 * | 10/2009 | Kubler | B65D 81/053 29/428 |
| 2011/0260495 | A1 * | 10/2011 | Hafften | F41H 5/226 296/146.1 |
| 2012/0174514 | A1 * | 7/2012 | Nolan | E06B 1/34 52/309.1 |
| 2012/0269995 | A1 * | 10/2012 | Leighton | B32B 7/04 428/34 |
| 2013/0171398 | A1 | 7/2013 | Stranner | |

FOREIGN PATENT DOCUMENTS

| | | |
|---|---|---|
| DE | 10244368 A1 | 4/2004 |
| DE | 202007001565 U1 | 4/2007 |
| EP | 1010963 A2 | 6/2000 |
| EP | 1250560 B1 * | 7/2003 |
| EP | 2434249 B1 | 3/2012 |

OTHER PUBLICATIONS

Machine Translation of EP 1,250,560 B1, obtained using Google Patents; retrieved on May 11, 2016.*

Machine Translation of CN 101,368,468A, obtained using Google Patents on Oct. 4, 2015.*

International Search Report dated Nov. 21, 2011 in International Application No. PCT/EP2011/004803, filed Sep. 21, 2011.

* cited by examiner

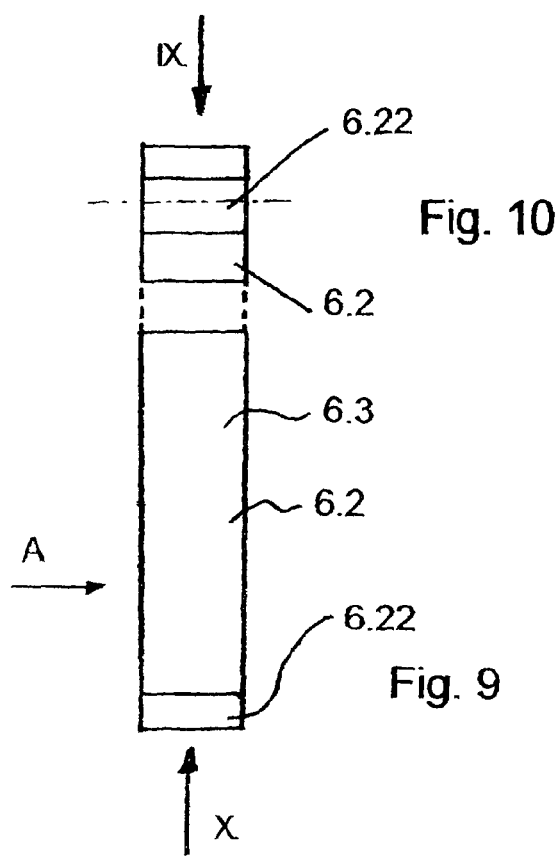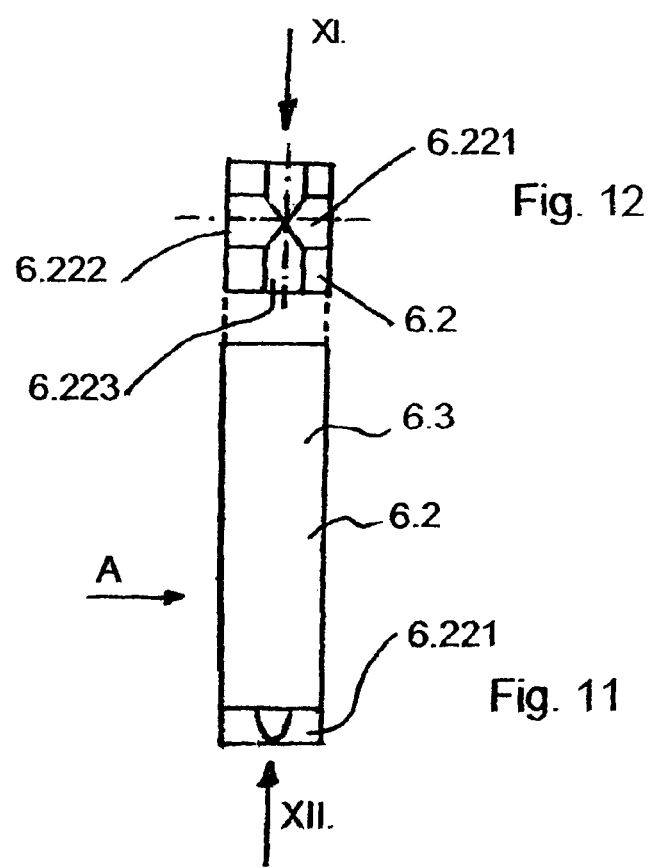

BULLET-PROOF GLASS PANE WITH EDGE REINFORCEMENT

RELATED APPLICATIONS

The present application is a National Phase of International Application Number PCT/EP2011/004803, filed Sep. 21, 2011, and claims priority from European Application Number 10010233.4, filed Sep. 22, 2010.

The present invention relates to a bullet-proof glass pane with edge reinforcement.

A typical bullet-proof glass pane is described, for example, in EP 1 010 963 B1. This bullet-proof glass pane has the structure of a composite glass pane comprising a plurality of glass panes and interposed composite layers of plastic material, e.g. polyurethane. At the peripheral edge or circumference of the prior-art bullet-proof glass pane, there is a projection with an inside step. On the inside of the projection, there is a peripheral edge reinforcement integrated as a part of the composite, which has a rectangular cross-section and is arranged on the surface of the projection, which faces the inside of the vehicle. This edge reinforcement is formed as a welded or punched frame and consists, for example, of metal or stainless steel. The metal edge reinforcement is subject to relatively high temperature-dependent positional variations which can even lead to cracking, splintering or other damage to the bullet-proof glass pane in the edge area.

It is thus an object of the present invention to provide a bullet-proof glass pane with edge reinforcement, which is adapted to prevent damage to the bullet-proof glass pane due to temperature fluctuations.

The object is achieved by a bullet-proof glass pane with edge reinforcement as described herein. Accordingly, for use in a motor vehicle, the bullet-proof glass pane of the present invention is formed of a plurality of panes and layers of glass, ceramic or plastic material, as a composite of layers bonded together at their interfaces, and has an edge reinforcement extending at a circumference of the bullet-proof glass pane and has at least two reinforcing members, which are in mobile or loose mutual engagement to form the edge reinforcement.

This loosely coupled structure of the edge reinforcement of the bullet-proof glass pane of the present invention has the key advantage that sufficient relative movement of adjacent reinforcing members with respect to each other is possible, enabling inevitable dimensional and length variations due to temperature fluctuations without causing damage to the pane structure. A loose mutual engagement, in the context of the present invention, is understood to mean that the reinforcing members are not connected to each other by fixed means, such as screwing or welding, but are able to move with respect to each other.

Moreover, the invention helps to simplify the manufacture or installation of bullet-proof glass panes with edge reinforcement, since the alignment of the frame parts or edge reinforcement parts is provided due to the mutual engagement of the reinforcing members during assembly and when the edge reinforcement is arranged on the bullet-proof glass pane during bullet-proof glass pane manufacture.

Preferably, the ends of two adjacent reinforcing members of the edge reinforcement are in mutual engagement with each other in such a manner that they are moveable with respect to each other and overlap each other. Due to the mutual engagement of the ends, the reinforcing members within the edge reinforcement can be aligned and arranged as desired.

The edge reinforcement of the bullet-proof glass pane of the present invention can have one of the ends of adjacent reinforcing members provided with a receiving portion or a plurality of receiving portions, and the end of the other reinforcing member provided with a protrusion or a plurality of protrusions, which fit(s) into the receiving portion(s). This receiving/protruding system can ensure sufficient overlapping of the reinforcing members, and thus also the desired strength and stability of the edge reinforcement during ballistic or blow impact stresses.

The receiving portion or portions, and the corresponding protrusion or protrusions of the reinforcing members can have a conical form. By these means, a self-centering or aligning effect of the reinforcing members can be achieved during relative movement of the reinforcing members of the edge reinforcement with respect to each other due to temperature fluctuations.

Preferably, the ends of two adjacent reinforcing members of the edge reinforcement are in mutual engagement in the manner of a tongue and groove system, wherein the end of the one reinforcing member is provided with a groove or a plurality of grooves, and the end of the other adjacent reinforcing member is provided with a tongue or a plurality of tongues that fit into the groove(s).

The ends of two adjacent reinforcing members of the edge reinforcement can also be in mutual engagement or fitted together in the manner of a plug and socket system, wherein the end of the one reinforcing member is provided with a socket or a plurality of sockets, and the end of the other neighboring or adjacent reinforcing member is provided with a plug member or a plurality of plug members, which fit as a protrusion or protrusions into the associated receiving portion(s).

Herein, a reinforcing member of the edge reinforcement can either be provided with a protrusion or tongue at each of its ends, or a reinforcing member of the edge reinforcement can be provided with a receiving portion or groove at each of its ends. In another embodiment of the invention, a reinforcing member of the edge reinforcement can be provided with a protrusion or tongue at one end and with a receiving portion or groove at the other end. It is also possible for one reinforcing member of the edge reinforcement to be provided with a protrusion or tongue at one end and to be formed as a blind part at the other end, or for a reinforcing member of the edge reinforcement of the invention to be provided with a receiving portion or groove at one end, and to be formed as a blind part at the other end. A reinforcing member can also be provided with a protrusion or a plurality of protrusions and/or with a receiving portion or a plurality of receiving portions at one end. The different configurations of the ends of the reinforcing members provide for a great variety of implementations of edge reinforcements for bullet-proof glass panes.

The mutually engaging ends of two adjacent reinforcing members of the edge reinforcement can have mutually facing, exposed, planar abutment surfaces that extend in parallel to a cross-sectional plane of the reinforcing members or of the edge reinforcement and abut each other when the two adjacent reinforcing members are in complete engagement.

The edge reinforcement of the bullet-proof glass pane of the present invention can have reinforcing members of metal, in particular of stainless steel and/or of a ceramic material, in particular aluminum oxynitride (AlON).

The edge reinforcement, or each reinforcing member of the edge reinforcement, with the exception of the coupling ends, can have an essentially rectangular cross-section, an angular or L-shaped cross-section, or a T-shaped cross-section.

Preferably, the bullet-proof glass pane has a step in the edge area, comprising a projection, which is formed by a portion of a glass pane, with the portion protruding out over the other glass panes, and by at least a portion of the edge reinforcement. As a rule, the projection is intended to come into engagement with the aperture in a vehicle body and to hold or fix the bullet-proof glass pane in place in the body.

The edge reinforcement can completely or at least partially cover the inside surface of the projection of the bullet-proof glass pane in order to improve the ballistic and penetration-preventing properties of the bullet-proof glass pane.

The edge reinforcement can be fixed on a peripheral end face or on a circumferential surface and at least partially or completely cover the end face or the circumferential surface in order to prevent splintering of the bullet-proof glass pane into the interior of the vehicle in the case of shooting or impact from outside.

The tongue or the protrusion of a reinforcing member can be conical and can have, e.g., a semicircular or v-shaped contour, or can have, e.g., parallel side surfaces resulting in a u-shaped contour of the projection. The associated receiving portion or groove will have the matching shape.

Further advantages, advantageous further developments and usages of the invention can be derived from the following description of exemplary and preferred embodiments of the invention with reference to the drawings, wherein.

Figure 6:
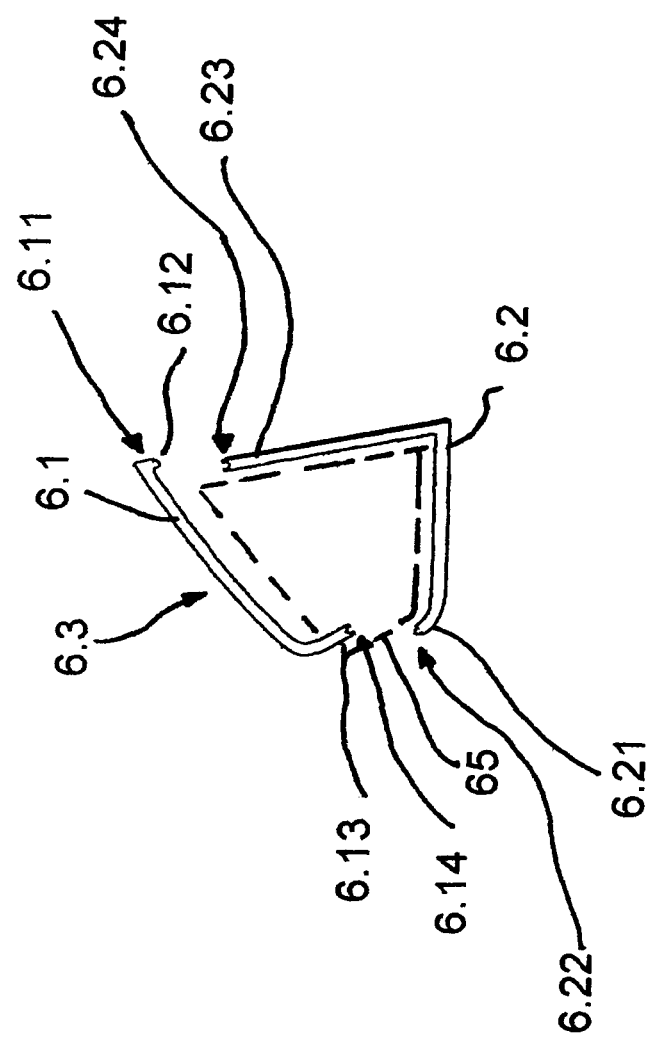
FIG. 6 is a detached side view of a two-part edge reinforcement, again for a bullet-proof glass pane having a different pane contour.

FIG. 9 and FIG. 10 are associated views of a detail of the edge reinforcement of FIG. 6, wherein FIG. 10 is the view in the direction indicated by arrow X in FIG. 9 and wherein FIG. 9 is the view in the direction indicated by arrow IX in FIG. 10; and FIG. 11 and FIG. 12 are associated views of a modification of the embodiment of FIG. 9 and FIG. 10, wherein FIG. 12 is the view in the direction indicated by arrow XII in FIG. 11 and FIG. 11 is the view in the direction indicated by arrow XI in FIG. 12.

Figure 1:
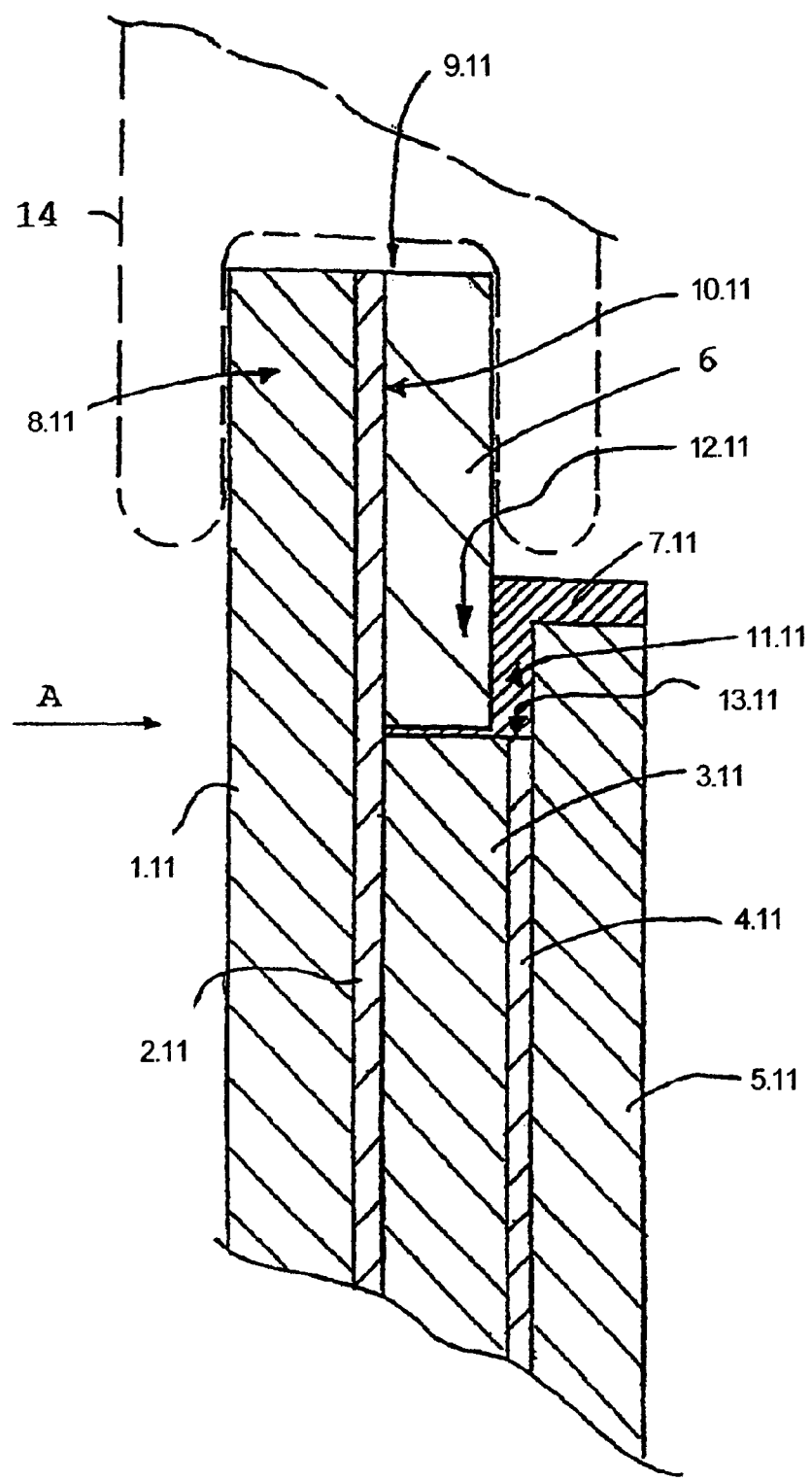
FIG. 1 is a schematic cross-sectional view of a bullet-proof glass pane of a preferred embodiment of the invention having an integrated multi-part edge reinforcement.

FIG. 1 shows a partial view of a preferred embodiment of the bullet-proof glass pane of the invention as a composite security pane in cross-section, with a vehicle frame 14 indicated as a broken line. In the following, the inventive embodiment shown in FIG. 1 will be described in detail while making exemplary reference to the use of the bullet-proof glass pane according to the present invention as a retractable side window in a motor vehicle.

The bullet-proof glass pane according to the present invention has sandwiched or laminated glass panes 1.11, 3.11 and 5.11, wherein the inner glass pane 5.11 is arranged toward the interior of the vehicle, the outer glass pane 1.11 is arranged toward the exterior of the vehicle and the central glass pane 3.11 is arranged between the outer glass pane 1.11 and the inner glass pane 5.11. The outside, and thus the side of the vehicle facing impact, is indicated by arrow A in FIG. 1, which points toward the outer glass pane 1.11. A polyurethane layer 2.11 extends between the outer glass pane 1.11 and the central glass pane 3.11, forming a composite between the outer glass pane 1.11 and the central glass pane 3.11. The polyurethane layer 2.11, or polyurethane foil, has the same contour and extension as the outer glass pane 1.11. Between the central glass pane 3.11 and the inner glass pane 5.11, for example, a further polyurethane layer 4.11 or a composite layer of polyvinyl butyral (PVB) is formed, which, in turn, forms a fixed composite between the central glass pane 3.11 and the inner glass pane 5.11. The polyurethane layer 4.11 has the same extension as the adjacent surface of the central glass pane 3.11.

The outer glass pane 1.11 projects out over the two other glass panes 3.11 and 5.11 in a projection 8.11 at the edge of the bullet-proof glass pane shown, whereby a stepped configuration or step with respect to the other glass panes 3 and 5 is formed at the end face or peripheral surface. On the surface 10.11 of the polyurethane layer 2.11 facing toward the inside in the area of the projection 8.11, an edge reinforcement 6 is installed, which can consist of stainless steel, for example, which at least partially surrounds the bullet-proof glass pane in the manner of a frame, and which forms a fixed composite with the outer glass pane 1.11 by means of the polyurethane layer 2.11.

At an end face 9.11 of the bullet-proof glass pane or at the end face of the projection 8.11, the outer glass pane 1.11, the polyurethane layer 2.11 and the edge reinforcement 6 are flush with respect to each other. The edge reinforcement 6 has a rectangular cross-section. The projection 8.11, which is thus formed by the edge reinforcement 6, the outer glass pane 1.11 and the interposed composite layer 2.11, is supported in a frame 14 of the motor vehicle, shown in cross-section in FIG. 1 as a broken line, and extending in the roof area of the motor vehicle. In the position shown in FIG. 1, the projection 8.11 of the bullet-proof glass pane extends into the frame 14. The side window shown is thus wound up, and the window is closed.

In the area of the step of the bullet-proof glass pane shown, the inner glass pane 5.11 projects out over the central glass pane 3.11, thus creating a recess 12.11 or groove or receiving portion in the area between the inner glass pane 5.11, the central glass pane 3.11, which is flush with the polyurethane layer 4.11 at the end face, and the continuous polyurethane layer 2.11. The edge reinforcement 6 extends into the recess 12.11 and abuts the end face of the central glass pane 3.11 in an approximate butt engagement. At the end face, the central glass pane 5.11 is provided with a seal 7.11, e.g. of polyurethane, which also fills or seals cavities 11.11 within the recess 12.11 between the adjacent surfaces of the edge reinforcement 6, the central glass pane 3.11, and the polyurethane layer 4.11—or the bottom 13.11 of the recess 12.11—the inner glass pane 5.11 and the polyurethane layer 2.11 within the recess 12.11.

For an exemplary bullet-proof glass pane of the invention according to FIG. 1, the thicknesses of the outer and central glass panes 1.11, 3.11 are 4 mm each, the thickness of the inner glass pane 5.11 is 8 mm, the thicknesses of the polyurethane layers 2.11 and 4.11 are 1 mm each, and the thickness of the edge reinforcement 6 of steel is about 2.5 mm. A succession of layers of polyurethane and polycarbonate can also be applied over the entire surface in this order on the inside surface of the inner glass pane 5.11, wherein the thickness of this additional polyurethane layer is about 1.9 mm and the thickness of the polycarbonate pane is about 2.5 mm.

Shearing-off of the projection 8.11 at the transition area between the edge reinforcement 6 and the central glass pane 3.11 is prevented by the overlapping configuration of the inner glass pane 5.11 with respect to the surface of the edge reinforcement 6 facing it.

Figure 2:
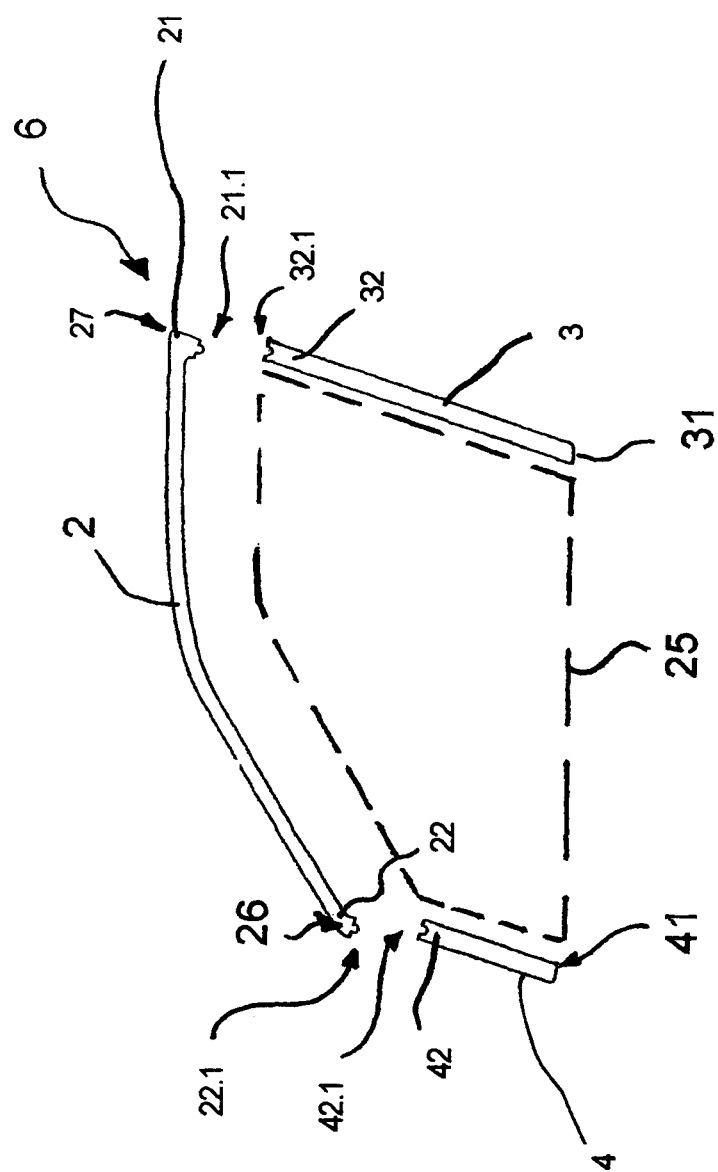
FIG. 2 is a schematic, detached side-view of an edge reinforcement in an exploded view, which can be used in the embodiment of FIG. 1 and is configured as a three-part structure with three series-arranged reinforcing members.

FIG. 2 schematically shows a preferred embodiment of the edge reinforcement 6 of the bullet-proof glass pane according to the present invention in a detached side view. The edge reinforcement 6 overall is composed of three series-connected parts or reinforcing members 2, 3 and 4, which have been separated for clarity, but which are aligned as intended for incorporation into the bullet-proof glass pane of FIG. 1. The associated contour 25 of the bullet-proof glass pane of FIG. 1 is schematically shown in FIG. 2 as a broken line.

The three reinforcing members 2, 3, 4 of the edge reinforcement 6 have a strip-like and relatively elongate configuration and all have essentially the same rectangular cross-section, when the cross-section is viewed, for example, at a middle position of the reinforcing members 2, 3, 4, as also shown in FIG. 1. When the three reinforcing members 2, 3 and 4 shown, are assembled, the result is the frame-like edge reinforcement 6 on three sides of the bullet-proof glass pane. The reinforcing members 2, 3 and 4 can be manufactured by punching them out of a punch sheet.

The reinforcing member 2 of the edge reinforcement 6 is curved, or bent, as can be derived from FIG. 2, according to the contour 25 of the bullet-proof glass pane and has two closed ends 21 and 22. A contour, or central line, of the reinforcing member 2 follows, for example, the upper edge of the corresponding bullet-proof glass pane, in which the reinforcing member 2 is integrated as a composite part of the composite bullet-proof glass pane of FIG. 1.

At one end 21 of the reinforcing member 2, a tongue 21.1 or projection projects out, wherein the end 21 extends over a corner 27 of the edge reinforcement 6. At the other end 22 of the reinforcing member 2, there is a further tongue 22.1 or a further protrusion, which protrudes at the end 22, which also extends around a corner 26 of the edge reinforcement 6. Each of the tongues 21.1 and 22.1 are conically tapered, or each have side faces extending in parallel with respect to each other.

Figure 4:
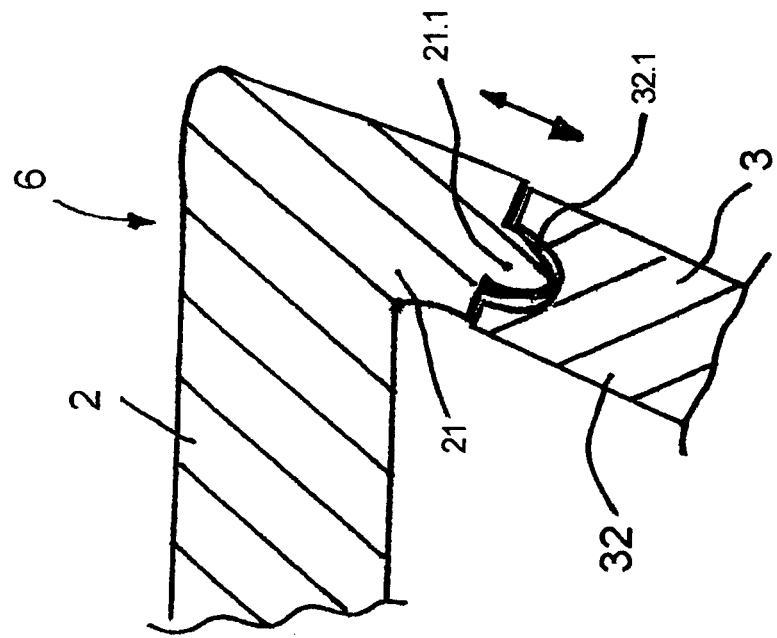
FIG. 4 is an enlarged detail view of FIG. 2 according to the section of FIG. 3, wherein, unlike FIG. 3, the two reinforcing members of the edge reinforcement shown are in complete engagement.

The elongate, straight reinforcing member 3 of the edge reinforcement 6 is provided with a continuous groove 32.1 or receiving portion at one end 32, into which the tongue 21.1 of the reinforcing member 2 fits or is in engagement. If the reinforcing member 2 and the reinforcing member 3 are in complete engagement with each other, as shown in FIG. 4, the tongue 21.1 of the reinforcing member 2 is in engagement with the groove 32.1 of the reinforcing member 3, and planar abutting surfaces 21.2 of the end 21 of the reinforcing member 2, and planar abutting surfaces or end faces 32.2 of the end 32 of the reinforcing member 3 abut each other. The other end 31 of the reinforcing member 3 is formed as a blind part, or has a blunt end. The groove 32.1 is conically flared, or has inside side surfaces extending in parallel with respect to each other, and matches precisely the associated tongue 21.1 of the reinforcing member 2.

The third reinforcing member 4 of the edge reinforcement 6 also has a strip-like, elongate and straight configuration, and has one end 42 facing the end 22 of the reinforcing member 2, and a further end 41, which is formed as a blind part or closed end. At the end 42, the reinforcing member 4 has a continuous groove 42.1 with neighboring abutment surfaces 42.2. The groove 42.1 of the end 42 is conical, or formed with planar parallel inside surfaces in such a manner that the tongue 22.1 of the end 22 of the reinforcing member 2 fits into the groove 42.1 of the reinforcing member 4, when the edge reinforcement 6 is assembled. When the tongue 22.1 is in complete engagement in groove 42.1, the planar abutment surface of the end 22 of the reinforcing member 2 and the abutment surfaces of the end 42 of the reinforcing member 4 abut each other.

Figure 3:
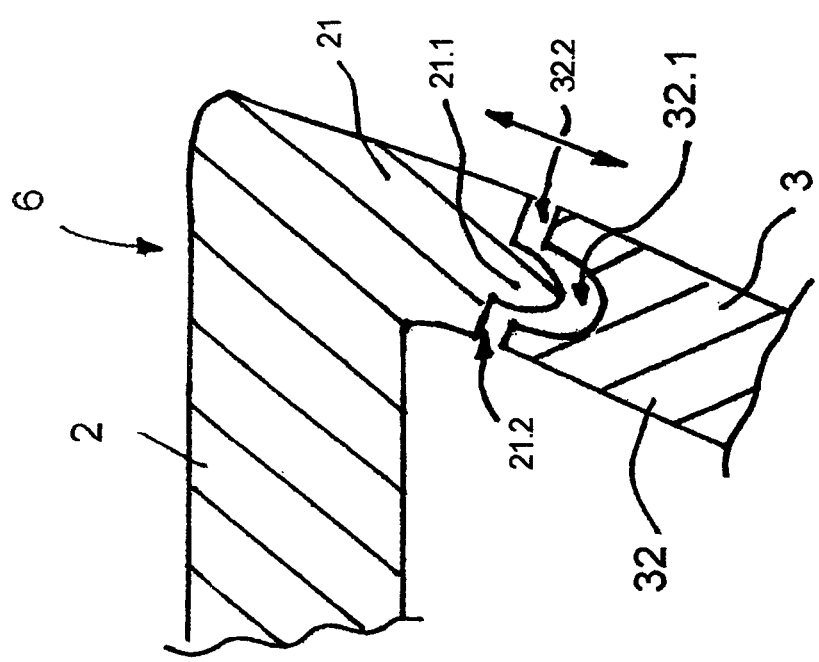
FIG. 3 is an enlarged detail view of FIG. 2 according to a section, in which two adjacent reinforcing members of the edge reinforcement according to FIG. 2, having a tongue and groove system, abut each other, wherein the two reinforcing members shown only partially engage each other.

A height of the tongue 21.1 and the corresponding depth of the groove 32.1, which are associated with each other, are the same and match each other in such a manner that the tongue 21.1 and the associated groove 32.1 do not come out of engagement with respect to each other in the event of a relative movement between the reinforcing member 2 and the reinforcing member 3 at the ends 21 and 32. This means that the tongue cannot move fully out of the groove, which enables the alignment of the reinforcing members 2 and 3 with respect to each other despite a relative movement due to, for example, temperature fluctuations or mechanical stresses in the bullet-proof glass pane, in which the edge reinforcement 6 is integrated, to be maintained. For clarity, a state is shown in FIG. 3, in which the tongue 21.1 of the reinforcing member 2 is only in partial engagement with the associated groove 32.1 of the reinforcing member 3 of the edge reinforcement 6. FIG. 4, on the other hand, as stated before, shows full engagement of tongue 21.1 and groove 32.1.

When the tongue 22.1 is in complete engagement in the corresponding groove 42.1 of the reinforcing member 4, the planar abutment surfaces abut each other, which can occur, for example, in the case of a high ambient temperature at the bullet-proof glass pane and a correspondingly large expansion of the edge reinforcement 6. With the tongue and groove system 22.1 and 42.1 of the reinforcing members 2 and 4, a predefined alignment of the two reinforcing members 2 and 4 can be maintained even when the two ends 22 and 42 move relative to each other, wherein, at the ends 22 and 42, the height of the tongue 22.1 or the depth of the groove 42.1 are dimensioned such that the tongue 22.1 should not entirely come out of engagement with the groove 42.1 of the reinforcing member 4.

Figure 5:
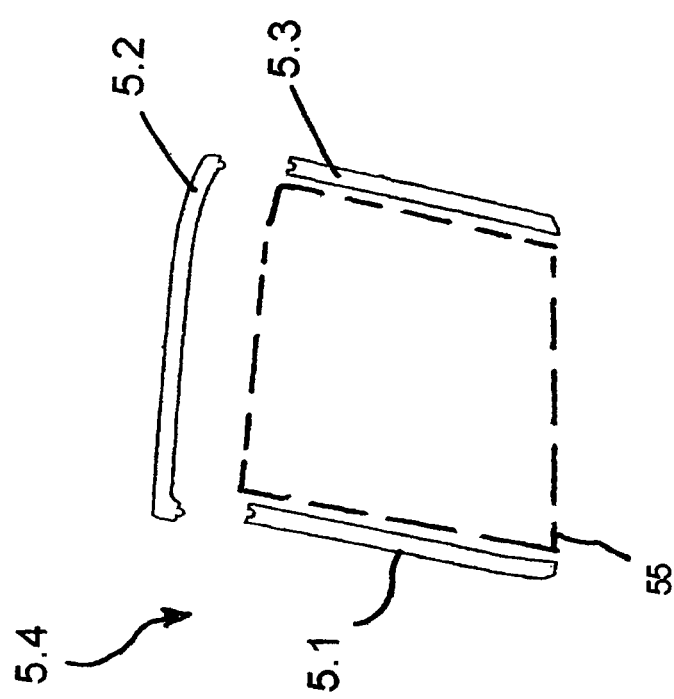
FIG. 5 is a schematic side view of a detached and disassembled further edge reinforcement in a bullet-proof glass pane, having a contour which is different from the bullet-proof glass pane of FIG. 2.

FIG. 5 shows a schematic side view of a detached and disassembled edge reinforcement 5.4 for a bullet-proof glass pane of a further embodiment of the invention, with a pane contour 55 which, again, is schematically shown as a broken line in FIG. 5, and which is different from the contour 25 of the bullet-proof glass pane of FIG. 2.

The three reinforcing members 5.1, 5.2 and 5.3 of the edge reinforcement 5.4, again have a strip-like and relatively elongate configuration and have the same essentially rectangular cross-section when the cross-section is viewed approximately in the middle position of the reinforcing members. When the three reinforcing members 5.1, 5.2 and 5.3, shown, are assembled and arranged in series, the frame-like edge reinforcement 5.4 on three sides of the bullet-proof glass pane results, which can have the cross-section of FIG. 1.

The reinforcing member 5.2 of the edge reinforcement 5.4 has the form of a bracket, is slightly curved corresponding to the contour 55 of the bullet-proof glass pane and is otherwise similar to the reinforcing member 2 of FIG. 2. The reinforcing member 5.1 of the edge reinforcement 5.4 is straight and elongate similar to the reinforcing member 3 of FIG. 2. The reinforcing member 5.3 of the edge reinforcement 5.4 is also straight and elongate similar to the reinforcing member 3 of FIG. 2.

FIG. 6 is an exemplary schematic side view of a detached and disassembled edge reinforcement 6.3 for a bullet-proof glass pane of a further embodiment of the invention with a pane contour 65, again schematically shown as a broken line in FIG. 6, and which is different from the contour 25 of the bullet-proof glass pane of FIG. 2 or the contour 55 of the bullet-proof glass pane of FIG. 5.

The two reinforcing members 6.1 and 6.2 of the edge reinforcement 6.3, again, have a strip-like and relatively elongate configuration, and each have the same essentially rectangular cross-section, if the cross-section is viewed, for example, in a middle position of the reinforcing members. If the two reinforcing members 6.1 and 6.2 shown are assembled, a frame-like edge reinforcement 6.3 closed on all sides of the bullet-proof glass pane results, which, again, can have the cross-section as shown in FIG. 1.

The reinforcing member 6.1 of the edge reinforcement 6.3 is essentially curved in a hook shape corresponding to the contour 65 of the bullet-proof glass pane. At one end 6.11 of the reinforcing member 6.1, a conical tongue 6.11 protrudes, wherein the end 6.11 extends over a corner of the edge reinforcement 6.3. At the other end 6.13 of the reinforcing member 6.1, there is a conical groove 6.14.

The second reinforcing member 6.2 of the edge reinforcement 6.3 has an essentially two-leg and v-shape configuration corresponding to the contour 65 of the bullet-proof glass pane. At one end 6.21 of the reinforcing member 6.2, a conical tongue 6.22 protrudes, wherein the end 6.21 is bent in a hook shape and extends over a corner of the edge reinforcement 6.3. The tongue 6.22 of the reinforcing member 6.2 matches the groove 6.14 of the reinforcing member 6.1. At the other end 6.23 of the reinforcing member 6.2, there is a conical groove 6.23, into which the tongue 6.12 of the reinforcing member 6.1 fits.

Figure 7:
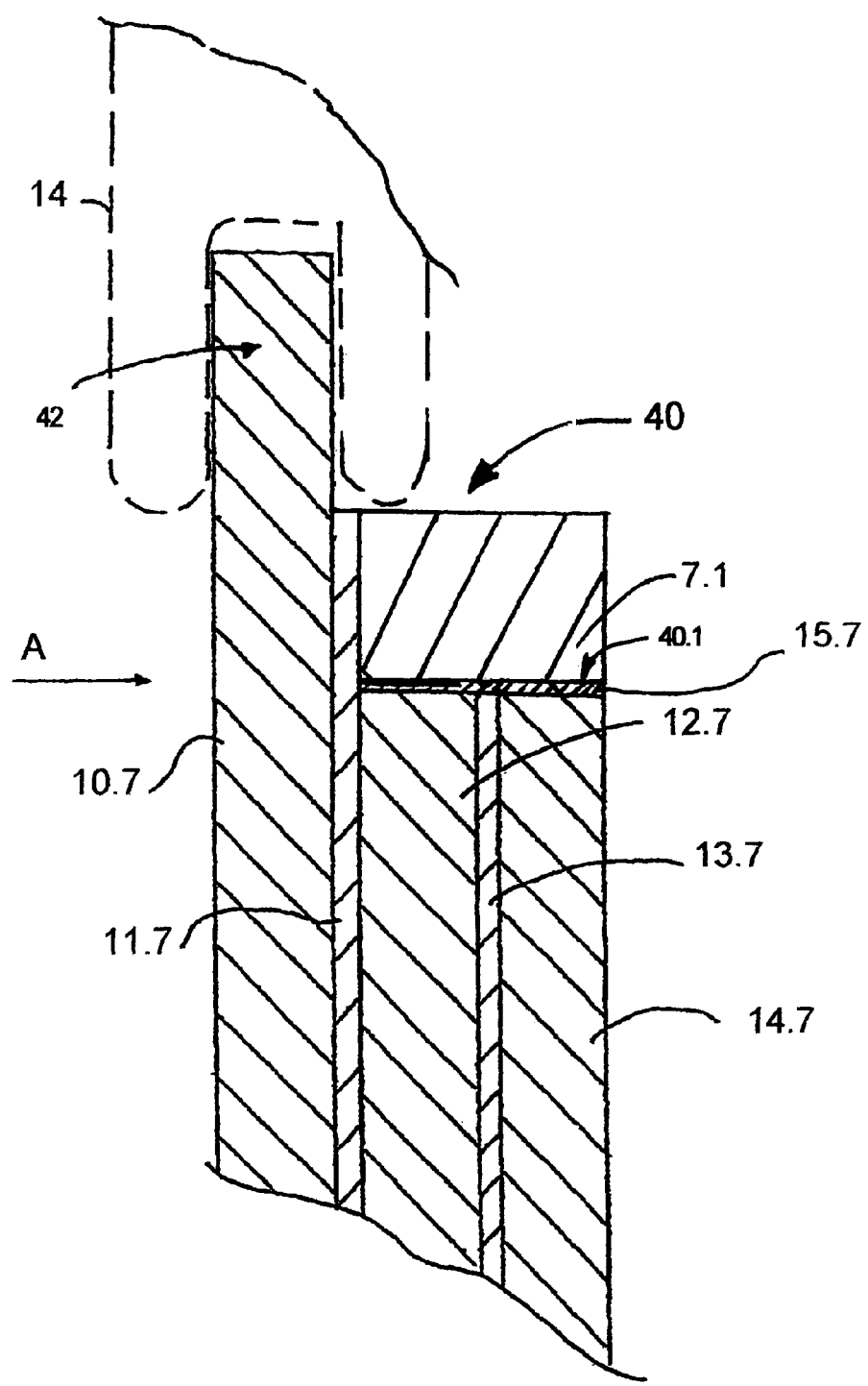
FIG. 7 is a schematic sectional view of a bullet-proof glass pane of a further embodiment of the invention in which, for example, a three-part edge reinforcement similar to that of FIG. 2 can be incorporated.

FIG. 7 shows a schematic sectional view of a bullet-proof glass pane in a further, exemplary embodiment of the invention, in which, for example, as an edge reinforcement 7.1, an adapted edge reinforcement 6 similar to the one in FIG. 2, an adapted edge reinforcement 5.4, similar to the one in FIG. 5, or an adapted edge reinforcement 6.3 similar to the one in FIG. 6 can be provided.

The bullet-proof glass pane of FIG. 7 has an overall structure of a composite pane and comprises a plurality of glass panes 10.7, 12.7 and 14.7 as a composite of layers bonded together at their interfaces. The glass panes 10.7 and 12.7 are bonded by means of a PVB (polyvinyl butyral) layer 11.7 or a polyurethane foil. The glass panes 12.7 and 14.7 are bonded together by means of a PVB layer 13.7. The glass pane 10.7 on the side of potential impact (cf. arrow A pointing in the shooting direction in FIG. 7), however, is longer than the other glass panes and projects out over the flush end faces of the other glass panes 12.7 and 14.7 in a peripheral edge area of the inventive bullet-proof glass pane shown. By these means, the glass pane 10.7 forms a projection 42, or a step 40, of the bullet-proof glass pane, wherein the projection 42 is in engagement with a body frame or door frame 14 of a motor vehicle.

In the step 40, i.e. at the end face extending across the glass panes 12.7 and 14.7, the edge reinforcement 7.1 is attached in the form, for example, of a strip-like steel sheet with a rectangular cross-section, which extends along the entire stepped edge area of the bullet-proof glass pane shown within the step 40. The edge reinforcement 7.1 completely or at least partially covers the edge area 40.1 extending across the end faces of the glass panes 12.7 and 14.7 within the step 40, adjacent to the inside of the outer glass pane 10.7. The multi-part edge reinforcement 7.1 is bonded to the inner surface of the glass pane 10.7 by a composite layer 11.7, a layer 30 of polyurethane is bonded with the glass pane 10, and is bonded with the end faces of the glass panes 12.7 and 14.7, flush with respect to each other, by means of a composite layer of, for example, polyurethane 15.7.

A composite layer of polycarbonate can be applied over the entire surface of the bullet-proof glass pane of FIG. 7 on the inner surface of the glass pane 14.7 and the edge reinforcement 7.1 facing the passenger cabin. In addition, the inner surface of the glass pane 10.7, that is the projection 42, and also the entire end face of the step 40, that is the peripheral end face of the edge reinforcement 7.1, can be covered by a polycarbonate layer or any other passivating layer, also consisting of a plurality of layers, e.g. a succession of layers of polyurethane and polycarbonate.

Figure 8:
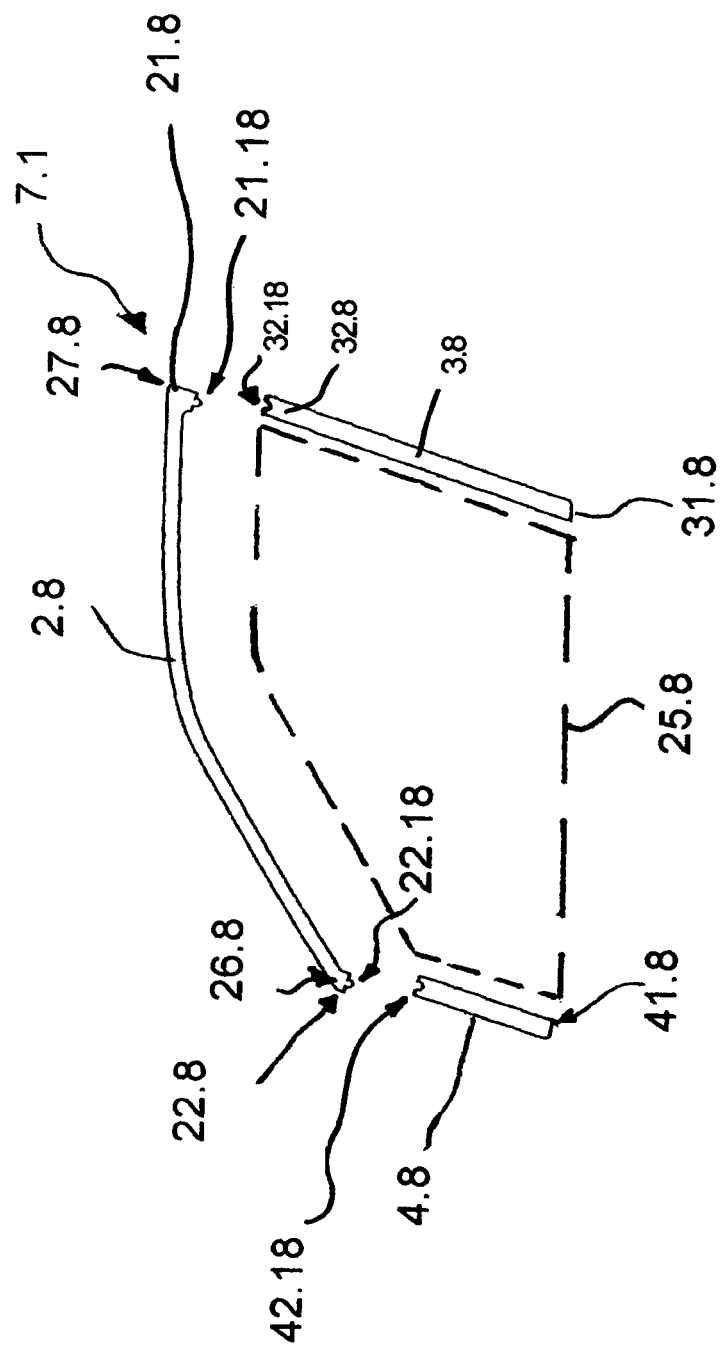
FIG. 8 is a schematic view of an exemplary edge reinforcement of the bullet-proof glass pane of the invention of FIG. 7.

FIG. 8 schematically shows an exemplary edge reinforcement 7.1 of the bullet-proof glass pane of the invention of FIG. 7 in a detached side view. The edge reinforcement 7.1 consists of a total of three parts or reinforcing members 2.8, 3.8 and 4.8 in a series arrangement, separated from each other for clarity, but aligned with respect to each other as intended in the bullet-proof glass pane of FIG. 7. An associated contour 25.8 of the bullet-proof glass pane of FIG. 7 is schematically shown in FIG. 8 as a broken line.

The three reinforcing members 2.8, 3.8, 4.8 of the edge reinforcement 6 have a strip-like and relatively elongate configuration, and each have the same essentially rectangular cross-section if the cross-section is viewed, for example, at a middle position of the reinforcing members 2.8, 3.8, 4.8, as also shown in FIG. 7. If the three reinforcing members 2.8, 3.8 and 4.8, shown, are assembled, and in engagement with each other, the result is the frame-like edge reinforcement 7.1 on three sides of the bullet-proof glass pane.

As can be derived from FIG. 8, the reinforcing member 2.8 of the edge reinforcement 7.1 is bent in a curve and bracket-shaped, corresponding to the contour 25.8 of the bullet-proof glass pane, and has two closed ends 21.8 and 22.8.

At the end 21.8 of the reinforcing member 2.8, a tongue 21.18 or a protrusion protrudes, wherein the end 21.8 extends over a corner 27.8 of the edge reinforcement 7.1. At the other end 22.8 of the reinforcing member 2.8, there is another tongue 22.18, or a further protrusion, which protrudes at the other end 22.8, which again, extends over a corner 26.8 of the edge reinforcement 7.1. The tongues 21.18 and 22.18 are each, for example, conically tapered.

The elongate, straight reinforcing member 3.8 of the edge reinforcement 7.1 is provided with a continuous groove 32.18 or receiving portion at one end 32.8, into which the tongue 21.18 of the reinforcing member 2.8 fits or can be in engagement. If the reinforcing member 2.8 and the reinforcing member 3.8 are in mutual engagement, the tongue 21.18 of the reinforcing member 2.8 is in engagement in the groove 32.18 of the reinforcing member 3.8 in the manner of a tongue and groove system. The other end 31.8 of the reinforcing member 3.8 is formed as a blind part, or as a blunt end. The groove 32.18 is conically flared, for example, and fits over the tongue 21.18 of the reinforcing member 2.8.

The third reinforcing member 4.8 of the edge reinforcement 7.1 is also formed as a strip-like, elongate and straight part, and has one end 42.8 facing the end 22.8 of the reinforcing member 2.8, and another end 41.8 formed as a blind part or closed end. At the end 42.8, the reinforcing member 4.8 has a continuous, for example conical, groove 42.18. The groove 42.18 of the end 42.8 in turn, is formed in such a manner that the conical tongue 22.18 of the reinforcing member 2.8 fits into the groove 42.18 of the reinforcing member 4.8, when the edge reinforcement 7.1 is integrated in the composite bullet-proof glass pane.

FIG. 9 and FIG. 10 show associated views of a detail of the edge reinforcement 6.3 of FIG. 6 (or of the edge reinforcement 5.4, 6 or 7.1) for clarity, wherein FIG. 10 is a view in the direction indicated by arrow X in FIG. 9, and wherein FIG. 9 is the view in the direction indicated by arrow IX in FIG. 10. More precisely, FIG. 9 and FIG. 10 show the continuous, conical tongue 6.22 at the end 6.21 of the reinforcing member 6.2 schematically detached, wherein the arrow A shows the direction of a shot impacting on the bullet-proof glass pane. The tongue 6.22 has a one-leg configuration. The associated groove 6.14 of the reinforcing member 6.1 has its form matched to this tongue 6.22, i.e. it has a continuous, conically flared opening in such a manner that the tongue 6.22 can engage the groove 6.14 and fit into it.

In FIG. 11 and FIG. 12 a modification of the embodiment of FIG. 9 and FIG. 10 is shown, wherein FIG. 12 is the view in the direction indicated by arrow XII in FIG. 11 and wherein FIG. 11 is the view in the direction indicated by arrow XI in FIG. 12. More precisely, the modification in FIG. 11 and FIG. 12 has a continuous tongue 6.221 at the end 6.21 of the reinforcing member 6.2. The tongue 6.221, or the protrusion, however, has a two-leg 6.222 and 6.223 configuration, arranged in a cross shape and at right angles to each other, in order to achieve improved impacting strength of the edge reinforcement 6.2. The associated groove 6.14 of the reinforcing member 6.1 is modified so that it matches this tongue 6.221 in its shape, i.e. is adapted to have two cross-shaped intersecting grooves, which are adapted to the tongue 6.221 in shape. Again, the tongue and groove can be, for example, conical.

The invention claimed is:

1. A bullet-proof glass pane for use in a motor vehicle, the bullet-proof glass pane comprising:
 a laminate of a plurality of panes and layers of glass, ceramic or plastic material bonded together at respective interfaces, wherein the laminate has
  opposing major surfaces each enclosed by a respective boundary, and
  a minor surface extending between the boundaries of the opposing major surfaces of the laminate and connecting the major surfaces with each other,
  wherein the minor surface defines a perimeter of the laminate, the perimeter between the boundaries of the opposing major surfaces of the laminate; and
 an edge reinforcement of ballistic material,
 wherein the edge reinforcement is attached on the minor surface of the laminate to extend along the perimeter of the laminate, and partially or completely covers the minor surface of the laminate,
 wherein the edge reinforcement comprises at least two reinforcing members, which are in loose mutual engagement at respective adjacent ends thereof in a direction along the perimeter of the laminate,
 wherein the adjacent ends of the two reinforcing members of the edge reinforcement engage each other in such a manner that the adjacent ends of the two reinforcing members are relatively moveable with respect to each other and overlap each other,
 wherein, of the adjacent and engaged ends, the end of one reinforcing member is provided with at least one receiving portion and the end of the other reinforcing member is provided with at least one protrusion, which fits into the receiving portion so that the at least two reinforcing members are arranged in a series along the perimeter of the laminate, wherein the at least one receiving portion and the at least one protrusion have matching conical configurations, wherein the reinforcement members of any pair of adjacent reinforcement members are engaged to each other, and wherein
  the protrusion projects, in a projecting direction along the perimeter of the laminate, from an end face of said one reinforcing member,
  when viewed in a direction opposite to the projecting direction, the protrusion has a cross-shaped configuration overlapping the end face of said one reinforcing member, and
  the receiving portion has a cross-shaped configuration matching the cross-shaped configuration of the protrusion, and
 wherein
  at least one reinforcing member of the edge reinforcement, at one end, is provided with a protrusion and, at the other end, is provided with a receiving portion, or
  at least one reinforcing member of the edge reinforcement,
   at one end, is provided with
    (i) at least one protrusion, or
    (ii) at least one receiving portion, or
    (iii) at least one protrusion and at least one receiving portion, and at the other end, is formed as a blind part.

2. The bullet-proof glass pane according to claim 1, wherein the at least one receiving portion includes at least one groove and the at least one protrusion includes at least one tongue, which fits into the groove.

3. The bullet-proof glass pane according to claim 1, wherein the adjacent and engaged ends of the two reinforcing members of the edge reinforcement have facing, exposed, planar abutment surfaces extending parallel to a cross-sectional plane of the reinforcing members or of the edge reinforcement and abut against each other, when the two reinforcing members are in complete engagement.

4. The bullet-proof glass pane according to claim 1, wherein the edge reinforcement or each reinforcing member of the edge reinforcement has essentially a rectangular, or angular or L-shaped, or T-shaped cross-section.

5. The bullet-proof glass pane according to claim 1, wherein at least one peripheral projection formed by at least one glass pane projects out over at least one of
 the other glass panes,
 at least one composite layer of plastic material, or
 the edge reinforcement.

6. The bullet-proof glass pane according to claim 1, wherein the laminate comprises:
   an outer, first glass pane,
   a second glass pane arranged inward next to the outer, first glass pane, and
   a third glass pane arranged inward next to the second glass pane,
   wherein the outer, first glass pane, at an edge of the bullet-proof glass pane, projects out over the second and third glass panes, and the third glass pane, at the edge of the bullet-proof glass pane, projects out over the second glass pane, so that a recess is formed between the outer, first glass pane and the third glass pane, and
   wherein the edge reinforcement extends into the recess in such a manner that the third glass pane overlaps the edge reinforcement and the second glass pane and the edge reinforcement are adjacent to each other at respective end faces.

7. The bullet-proof glass pane according to claim 1, wherein the ballistic material is selected from the group consisting of stainless steel and a ceramic material.

8. The bullet-proof glass pane according to claim 7, wherein the ceramic material is aluminum oxynitride (AlON).

9. The bullet-proof glass pane according to claim 1, wherein the loose mutual engagement of the adjacent ends of the two reinforcing members is free of screwing and welding.

10. The bullet-proof glass pane according to claim 1, wherein the cross-shaped configuration of the protrusion includes
    a first portion elongated in a thickness direction of the bullet-proof glass pane, and
    a second portion arranged at a right angle with respect to the first portion.

11. The bullet-proof glass pane according to claim 1, wherein in a plan view of the bullet-proof glass pane,
    the protrusion is tapered, in the projecting direction, from the end face of said one reinforcing member to a top part of the protrusion, and
    the receiving portion is a groove flared, in a direction opposite to the projecting direction, from a bottom of said groove to an end face of said other reinforcing member.

12. The bullet-proof glass pane according to claim 11, wherein the protrusion and the groove have matching conical configurations.

* * * * *